Figure 1:
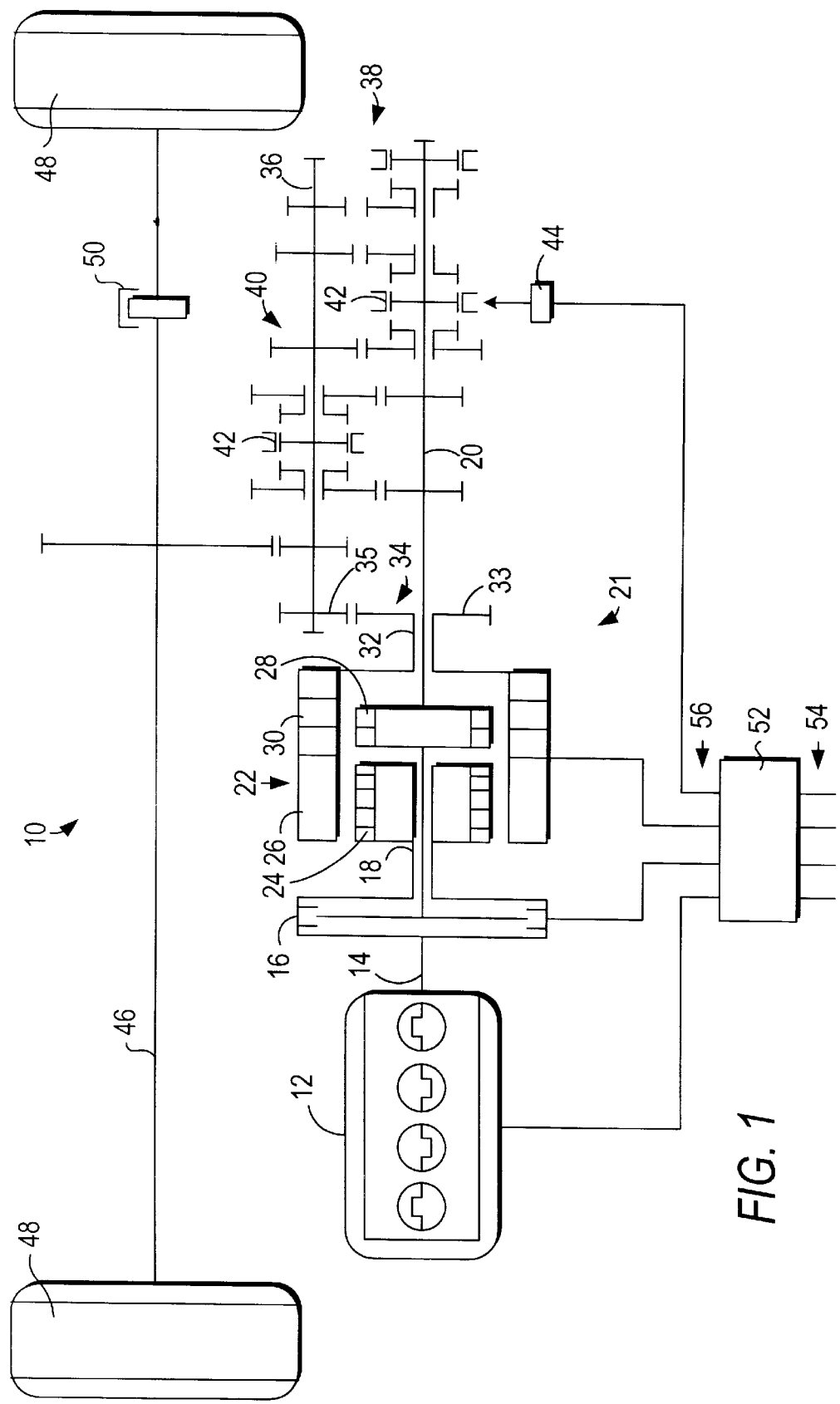

United States Patent
Loeffler et al.

[19]

[11] Patent Number: 6,159,127
[45] Date of Patent: Dec. 12, 2000

[54] DRIVE TRAIN FOR A MOTOR VEHICLE

[75] Inventors: Juergen Loeffler, Winnenden; Martin-Peter Bolz, Oberstenfeld, both of Germany

[73] Assignee: Robert Bosch GmbH, Stuttgart, Germany

[21] Appl. No.: 09/423,016

[22] PCT Filed: Feb. 6, 1999

[86] PCT No.: PCT/DE99/00314

§ 371 Date: Oct. 29, 1999

§ 102(e) Date: Oct. 29, 1999

[87] PCT Pub. No.: WO99/50572

PCT Pub. Date: Oct. 7, 1999

[30] Foreign Application Priority Data

Mar. 27, 1998 [DE] Germany .......................... 198 13 563
Oct. 26, 1998 [DE] Germany .......................... 198 49 156

[51] Int. Cl.⁷ .............................. F16H 3/12; B60K 6/02; B60K 41/22
[52] U.S. Cl. .................................................. 477/5
[58] Field of Search ..................................................... 477/5

[56] References Cited

FOREIGN PATENT DOCUMENTS

| 0 681 118 | 11/1995 | European Pat. Off. . |
| 2 630 868 | 11/1989 | France . |
| 42 02 083 | 7/1993 | Germany . |
| 86 03269 | 6/1986 | WIPO . |

*Primary Examiner*—Dirk Wright
*Attorney, Agent, or Firm*—Michael J. Striker

[57] ABSTRACT

A drive train (10, 10a, 10b) for a motor vehicle is proposed, in which an interruption in the traction force transferred by an internal combustion engine (12) to a transmission (36) dictated by disengaging at least one clutch (16, 42) is bypassed. This purpose is served by a device (21, 21a, 21b), which has an electrical machine (22, 22a, 22b) that is connected to a power takeoff side, in particular an output shaft (36) of the transmission (38). Thus when the traction force is interrupted by a clutch (16, 42), a traction force is transferred, which increases driving safety and comfort.

13 Claims, 4 Drawing Sheets

FIG. 3

| STANDARD GEAR RATIO a | 3,2 |
|---|---|
| GEAR RATIO i / GEAR WHEEL PAIR 35 | 0,35 |

2,86

TRANSMISSION SPREAD 38

5,1245

$$P = \frac{2\pi n}{60} * M$$

P[W] = 6000

| CLEAR | 1 | 2 | 3 | 4 | 5 | | 1 | 2 | 3 | 4 | 5 | |
|---|---|---|---|---|---|---|---|---|---|---|---|---|
| CLEAR RATIO | 3,5 | 1,95 | 1,226 | 0,830 | 0,683 | | 3,5 | 1,95 | 1,226 | 0,838 | 0,683 | |
| TRANSMISSION | | 1,795 | 1,591 | 1,463 | 1,227 | | | | | | | |
| OUTPUT SHAFT RPM nGe | RPM nR OF THE ELECTRICAL MACHINE | | | | | CAR IN MOTION | POSSIBLE TORQUE OF THE INTERNAL COMBUSTION ENGINE 12 THAT THE ELECTRICAL MACHINE 22a CAN SUPPORT | | | | | CAR NOT IN MOTION |
| 100 | | | | | | 420,0 | | | | | | 436.54 |
| 800 | 3104.0 | 2900.5 | 2629.2 | 2290.8 | 2048.1 | 3360.0 | 59.07 | 63.21 | 69.74 | 80.04 | 89.52 | 54.57 |
| 1000 | 3880.0 | 3625.6 | 3286.5 | 2863.5 | 2560.2 | 4200.0 | 47.25 | 50.57 | 55.79 | 64.03 | 71.61 | 43.65 |
| 1200 | 4656.0 | 4350.8 | 3943.0 | 3436.2 | 3072.2 | 5040.0 | 39.38 | 42.14 | 46.49 | 53.36 | 59.68 | 36.38 |
| 1400 | 5432.0 | 5075.9 | 4601.0 | 4008.9 | 3584.2 | 5880.0 | 33.75 | 36.12 | 39.85 | 45.74 | 51.15 | 31.18 |
| 1600 | 6208.0 | 5801.0 | 5258.3 | 4581.6 | 4096.3 | 6720.0 | 29.53 | 31.61 | 34.87 | 40.02 | 44.76 | 27.28 |
| 1800 | 6984.0 | 6526.2 | 5915.6 | 5154.3 | 4608.3 | 7560.0 | 26.25 | 28.09 | 30.99 | 35.57 | 39.79 | 24.25 |
| 2000 | 7760.0 | 7251.3 | 6572.9 | 5727.0 | 5120.4 | 8400.0 | 23.63 | 25.28 | 27.89 | 32.01 | 35.81 | 21.83 |
| 2400 | 9312.0 | 8701.5 | 7887.5 | 6872.4 | 6144.4 | 10080.0 | 19.69 | 21.07 | 23.25 | 26.68 | 29.84 | 18.19 |
| 2800 | 10864.0 | 10151.8 | 9202.1 | 8017.8 | 7168.5 | 11760.0 | 16.88 | 18.06 | 19.92 | 22.87 | 25.58 | 15.59 |
| 3200 | 12416.0 | 11602.1 | 10516.7 | 9163.2 | 8192.6 | 13440.0 | 14.77 | 15.80 | 17.43 | 20.01 | 22.38 | 13.64 |
| 3600 | 13968.0 | 13052.3 | 11831.3 | 10308.5 | 9216.6 | 15120.0 | 13.13 | 14.05 | 15.50 | 17.79 | 19.89 | 12.13 |
| 4000 | 15520.0 | 14502.6 | 13145.8 | 11453.9 | 10240.7 | 16800.0 | 11.81 | 12.64 | 13.95 | 16.01 | 17.90 | 10.91 |
| 4400 | 17072.0 | 15952.8 | 14460.4 | 12599.3 | 11264.8 | 18480.0 | 10.74 | 11.49 | 12.68 | 14.55 | 16.28 | |
| 4800 | 18624.0 | 17403.1 | 15775.0 | 13744.7 | 12288.8 | 20160.0 | 9.84 | 10.54 | 11.62 | 13.34 | 14.92 | |
| 5200 | 20176.0 | 18853.3 | 17089.6 | 14890.1 | 13312.9 | 21840.0 | 9.09 | 9.72 | 10.73 | 12.31 | 13.77 | |
| 5600 | 21728.0 | 20303.6 | 18404.2 | 16035.5 | 14337.0 | 23520.0 | 8.44 | 9.03 | 9.96 | 11.43 | 12.79 | |
| 6000 | 23280.0 | 21753.8 | 19718.8 | 17180.9 | 15361.1 | 25200.0 | 7.88 | 8.43 | 9.30 | 10.67 | 11.94 | |

DRIVE TRAIN FOR A MOTOR VEHICLE

PRIOR ART

The invention is based on a drive train for a motor vehicle as generically defined by the preamble to the main claim. In a drive train for a motor vehicle comprising a transmission, an internal combustion engine and a clutch disposed between them, the clutch in a gear change interrupts the traction force that is generated by the engine and transferred to the transmission. This fundamentally dictated loss of traction impairs driving safety and driving comfort.

ADVANTAGES OF THE INVENTION

The drive train according to the invention for a motor vehicle, having the characteristics of the body of the main claim, has the advantage over the prior art that in an interruption, dictated by a gear change, of the traction force of the engine by the clutch, a traction force is transferred by a device. This increases driving safety and comfort. It is especially advantageous to transfer the traction force via an electrical machine, and in particular a rotatably supported stator, with a rotor driven by the engine being set into a rotary motion. In that case, the courses of events can be regulated in an especially simple way by a controller. It is especially effective to couple this stator directly to a transmission output shaft. If the rotor is connected to a motor output shaft in a manner fixed against relative rotation, then there are no disadvantageous effects from possible slippage, for instance of a belt. If the rotor is connected to the output shaft of the engine via a fixed gear ratio, then a gear ratio adapted to the specific conditions of a particular drive train can be selected. If the electrical machine is also used to supply the on-board electrical system and/or for starting the engine, then conventional components previously required for these purposes can be dispensed with. If an additional stator and rotor are also integrated with the electrical machine, then the additional rotor can be used on the one hand to synchronize the rpm of the transmission input shaft and on the other for reinforcement during engine starting. For starting the engine, it is advantageous to block the transmission output shaft via a parking brake device. Disposing the electrical machine around the transmission input shaft is especially space-saving with regard to the radio installation space. A mechanical transmission with a variable gear ratio represents an especially sturdy version of a device for transferring a traction force.

DRAWING

Figure 2:
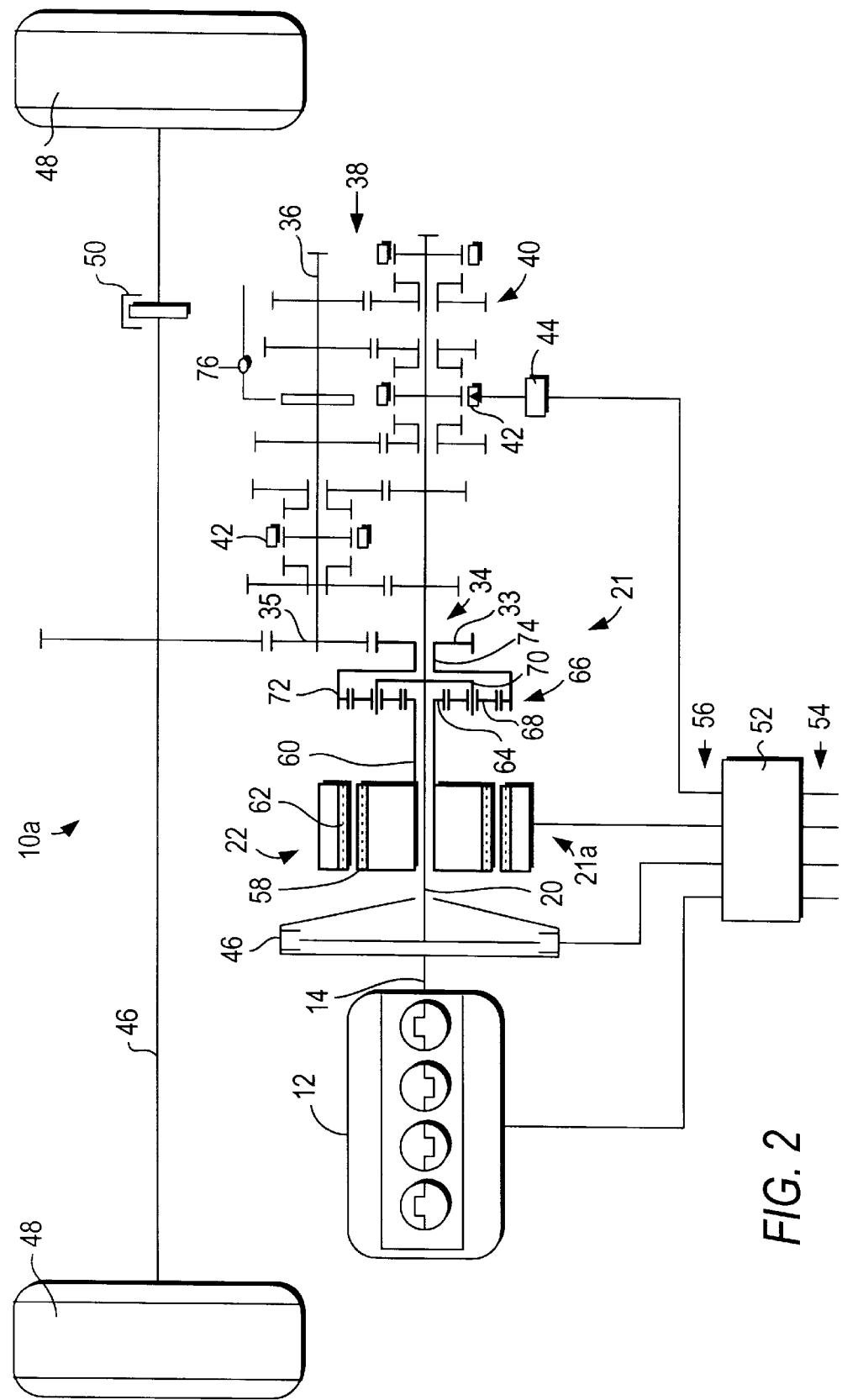
Figure 4:
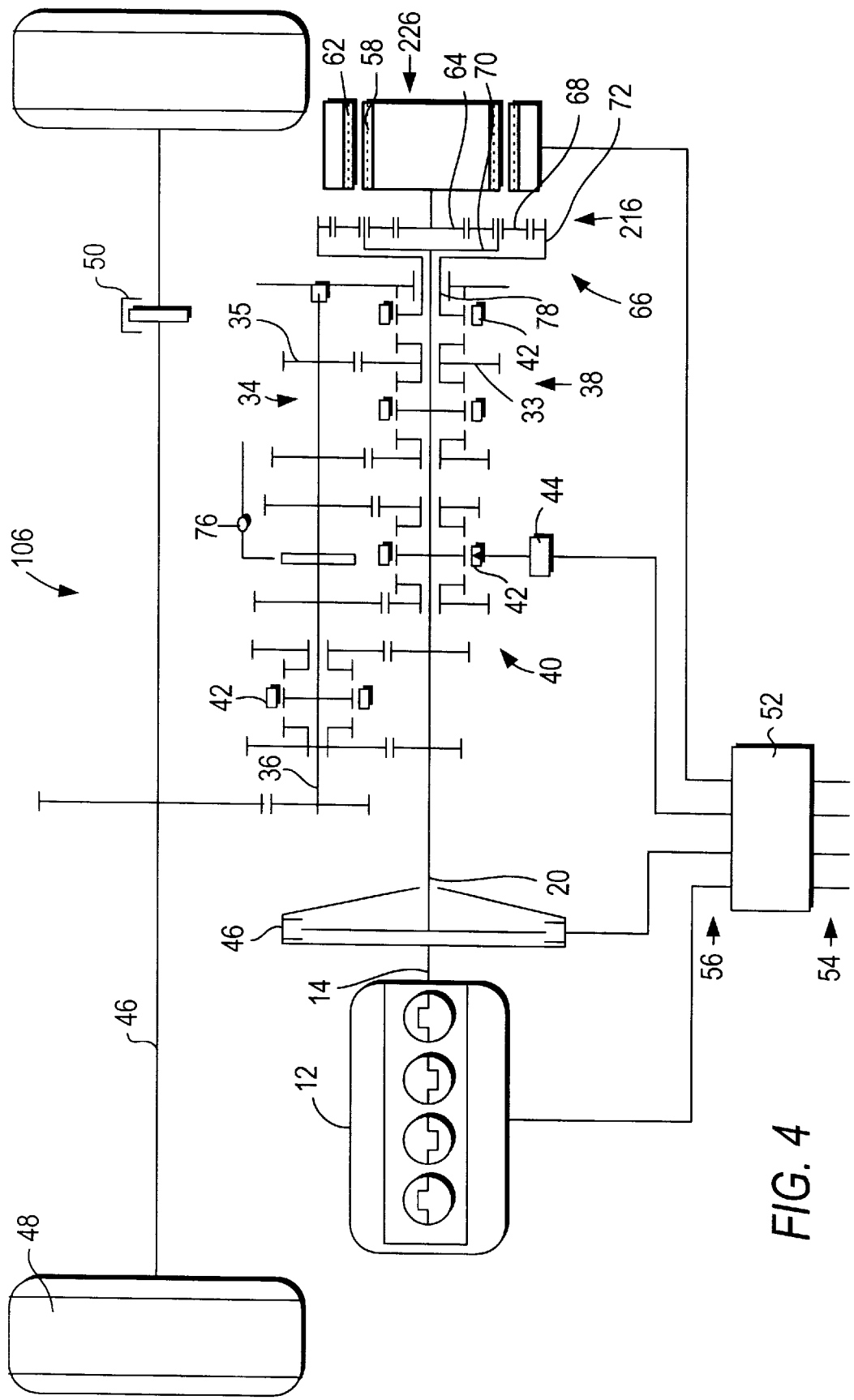

One exemplary embodiment of the invention is shown in the drawing and described in further detail below. Shown are FIG. 1, a symbolically represented drive train for a motor vehicle with an electrical machine;

FIG. 2, a drive train with a first modified electrical machine;

FIG. 3, a table showing various rotary speeds in rpm for the drive train with the first modified electrical machine; and FIG. 4, a drive train with a second modified electrical machine.

DESCRIPTION

In the drawing, a drive train 10 for a motor vehicle is shown, which has an internal combustion engine 12 that is connected via an output shaft 14 to a clutch 16 for interrupting the traction force upon a gear change. The clutch 16 is adjoined, in alignment with the output shaft 14, by a ring gear 18. The ring gear 18 is connected solidly to an outer part of the clutch 16, and as a result the ring gear 18 is connected to the output shaft 14 of the engine 12 in a manner fixed against relative rotation. A transmission input shaft 20 is also disposed centrally to the ring gear 18. The transmission input shaft 20 is operationally connected to the clutch 16; that is, when the clutch 16 is engaged, a traction force can be transferred from the engine 12 to the transmission input shaft 20, and with the clutch 16 disengaged, the traction force generated by the engine 12 is interrupted.

Also disposed around the transmission input shaft 20 is a device that has an electrical machine 22. The electrical machine 22 substantially comprises a first rotor 24 and a first, rotatably supported stator 26 cooperating electromagnetically with the rotor. The first rotor 24 is secured to the ring gear 18. Thus the first rotor 24 is connected to the output shaft 14 of the engine 12 in a manner fixed against relative rotation and in this sense can be driven by the engine 12.

Another component of the electrical machine 22 is a second rotor 28, which adjoins the first rotor 24 and is connected to the transmission input shaft 20 in a manner fixed against relative rotation. A second stator 30 is disposed around the second rotor 28 and enters into electromagnetic interaction with the second rotor 28. The first stator 26 and the second stator 30 in this case are connected in a manner fixed against relative rotation both to one another and to a further ring gear 32, which is disposed around the transmission input shaft 20. A first gear wheel 33 of an advantageously step-up gear wheel pair 34 is disposed on the ring gear 32. The second gear wheel 35 of the gear wheel pair 34, which has a smaller diameter than the first gear wheel 33, is disposed on a transmission output shaft 36 disposed parallel to the transmission input shaft 20. In this way, the first stator 26 and the second stator 30 are connected to the transmission output shaft 36; in particular, it is the first, larger stator 26 that cooperates with the transmission output shaft 36. The transmission input shaft 20 and the transmission output shaft 36 are essential components of a transmission 38; in the present exemplary embodiment, an automatic transmission is shown. This is accordingly a multi-speed change gear whose function and structure are known per se, with multiple speeds each embodied by pairs of gear wheels 40 that mesh with one another. One of each of the pairs of meshing gear wheels is solidly connected to the transmission input shaft 20 or the transmission output shaft 36, while the other, as an impeller, is supported on the transmission input shaft 20 or the transmission output shaft 36. For shifting the individual gears the applicable impeller is put into a rotationally fixed connection via a shifter unit 42 that is movable axially parallel on the transmission input shaft 20 or transmission output shaft 36. In this sense a shifter unit 42 is a clutch, which can interrupt the transfer of a traction force generated by the engine 12. By way of example, this shifter unit 42 can be a claw coupling, a shifting claw, or a synchronizing clutch or synchronizing cuff. Each shifter unit 42 is actuated by a transmission positioner 44; only one transmission positioner 44 is shown in the drawing. It is also possible to actuate a plurality of shifter units 42, via a suitable mechanical coupling to a transmission positioner 44.

The transmission output shaft 36 is operationally connected to an axle 46 of the motor vehicle. The axle 46 in turn drives two driven wheels 48. A parking brake device indicated by reference numeral 50 is shown on one end of the axle 46; in this case, this device is a so-called hill-holder.

A controller 52 is provided for controlling the drive train 10. The controller 52 has a plurality of inputs 54, to which signals are applied, for instance indicating the engine rpm, the torques transferred, the speed, the positions of the gas petal and shift lever, the clutch status, the energy to be expended for the on-board electrical system, and so forth. By way of outputs 56, the engine 12, clutch 16, electrical machine 22, transmission positioner 44, parking brake device 50, and so forth are controlled.

Once a gear has been selected and the motor vehicle is in motion, a traction force is transferred to the transmission 38 by the engine 12, via the output shaft 14, the engaged clutch 16, and the transmission input shaft 20. By way of a gear wheel pair 40 meshing with one another, the traction force is transferred to the transmission output shaft 36, from their to the axle 46, and finally to the driven wheels 48. Upon a gear change, the clutch 16 is first disengaged. This interrupts the traction force. As a result, the acceleration of the motor vehicle changes. Particularly in acceleration events, the deceleration of the motor vehicle that occurs during the gear change persists. This persistence is averted, however, by using the electrical machine 22. With the clutch 16 disengaged, the engine 12 continues to drive the rotor 24, which in turn enters into an electromagnetic interaction with the rotatably supported stator 26. The windings of the rotor 26 and stator 26 are triggered by the controller 52 in such a way that a force transfer takes place from the rotor 24 to the stator 26. The stator 26 and the stator 30 connected to it are set into a rotary motion about the axis of the transmission input shaft 20. As a result, the ring gear 32 and the meshing gear wheel pair 34 rotate as well. The transmission output shaft 36 and finally, via the axle 46, the wheels 48 are thus driven as well. The triggering of the arm 22 by the controller 52 is advantageously effected such that the sign of the acceleration of the motor vehicle does not change during a gear change. In the drive train 10 for a motor vehicle with a clutch 16 for interrupting the traction force in a gear change, a device that for instance has the electrical machine 22 and the gear wheel pair 34 is thus provided for transferring a traction force to a power takeoff side of the transmission 38. By this bypassing of the transmission 38, the driving safety and comfort during a gear change are increased substantially.

During the gear change thus described, the stator 30 and the second rotor 28, disposed fixedly on the transmission input shaft 20, are triggered by the controller 52 in such a way that the second rotor 28 accelerates or brakes the transmission input shaft 20 to the requisite synchronized rpm of the newly selected gear. In this way, the shifter units 42 can be designed quite simply, since synchronizing devices are no longer necessary.

When the motor vehicle is in motion, the transmission output shaft 36 rotates. Since the gear wheel pair 34 makes an upward speed change from the standpoint of the stator 26, this conversely means that from the standpoint of the transmission output shaft 36 it makes a step down to a slower speed. This assures that the stator 26 has a lower rotary speed than the rotor 24 that is coupled directly to the rpm of the engine 12. As a result of this differential rpm, the electrical machine 22 can be used to supply the on-board electrical system of the motor vehicle. Another advantage of this is that a power supply is assured even when the motor vehicle is stopped, since the rpm of the stator 26 is equal to zero, yet the rotor 24 continues to rotate at the rpm generated by the engine 12. To assure that the requisite electrical energy will suffice, the rotor 25 is acted upon by the controller 52, for instance with an exciter current.

The electrical machine 22 is also used for starting the engine 12. First, rotation of the transmission output shaft 36 is prevented by the parking brake device 50. With the clutch 16 disengaged, the rotor 24 of the electrical machine 22 is then set into a rotary motion by the controller 52, until the combustion process in the engine 12 begins. Starting the engine 12 can be additionally reinforced by an impulse start generated by the rotor 28. To that end, with the rotor 28, the transmission input shaft 20 is speeded up, but a gear is not selected. If the clutch 16 is then engaged, then the rotary impulse of the transmission input shaft 20 and of the rotor 28 is utilized for starting the engine 12.

Modifications of the electrical machine 22 are conceivable. For instance, the first stator 26 and the second stator 30 can be combined into a single stator. Two separate windings are then dispensed with. If a second stator 30 is used nevertheless, then it can also be decoupled from the first stator 26 and for instance supported nonrotatably. This makes the differential rpm between the second rotor 28 and the second stator 30 greater, for instance, and thus the electrical efficiency also rises. To that end, as is also possible in the above description, the toothing of one gear wheel of the gear wheel pair 34 can be embodied on the outer circumference of the first stator 26.

If a transmission 38 is used whose shifter units 42 are provided with synchronizing devices, and if it is necessary for space reasons, for instance, then the second rotor 28 and the second stator 30 can also be omitted. Because of the presence of synchronizing devices, adaptation of the rpm of the transmission input shaft 20 to a synchronizing rpm by the rotor 28 is no longer necessary.

It is not absolutely necessary to dispose the electrical machine 22 around the transmission input shaft 20. If there is enough radial installation space, then the rotor 24 of the electrical machine 22 can also be coupled to the output shaft 14 via a fixed gear ratio, for instance by means of a belt and pulleys. Thus pulleys whose gear ratio is adapted to the specific conditions of a drive train 10 can be selected. The connection of the stator 26 to the transmission output shaft 36 can also be embodied differently. For instance, the rotary motion of the stator 26 can also be effected to any component between the transmission output shaft 36 and the wheels 48 via a belt. All that is important is that the traction force to be transferred be effected by the electrical machine 22 to a power takeoff side of the transmission 38, so that during a gear change the transmission 38 is bypassed and a traction force continues to be transferred to the power takeoff side of the transmission.

The function of transferring a traction force to a power takeoff side of a transmission 38 can also be performed by some other device. It is conceivable that a transmission with an infinitely variable gear ratio, for instance in the form of a double-cone pulley wrapping transmission, which on the output side also acts on the transmission output shaft 26, may be driven by the output shaft 14 of the engine 12. The gear ratio in normal driving operation will be established by the controller 52 such that the transmission rotates idly with an infinitely variable gear ratio, without transferring any load. As a result, upon a gear change it thus already has the gear ratio required so that the motor vehicle will continue to experience a traction force, without unevenly varying its speed. In this case, however, the transmission with an infinitely variable gear ratio requires one additional clutch; otherwise a traction force would be transferred while the motor vehicle is stopped and the engine 12 is running.

FIG. 2 shows a drive train 10*a* with a modified electrical machine 22*a*. The rotor 58 of the electrical machine 22*a* has a ring gear 60, which is disposed around the transmission input shaft 20. The stator 62 of the electrical machine 22a is secured in a manner fixed against relative rotation, for instance on the gear box. The sun wheel 64 of a branching gear embodied as a planetary gear 66 is disposed on the ring gear 60, and as a result, the rotor 58 of the electrical machine 22a is connected to the sun wheel 64. Instead of a planetary gear 66, some other wheel-revolution gear can be provided as the branching gear. Thus the electrical machine 22a cooperates with the planetary gear 66. The electrical machine 22 and the planetary gear 66 are components of the device 21a. The sun wheel 64 meshes with the planet wheels 68, which are disposed in the planet carrier 70 of the planetary gear 66. The planet carrier 70 is connected in a manner fixed against relative rotation to the transmission input shaft 20. Alternatively, the planet carrier 70 can be connected to the engine output shaft 14. The ring gear 72 of the planetary gear 66, within which the planet wheels 68 revolve, is connected to a hollow shaft 74 that is disposed on the transmission input shaft 20. The gear wheel 23 of the gear wheel pair 34 is also disposed on the hollow shaft 74. The ring gear 72 thus acts on the transmission output shaft 36. A parking block 76 is also provided in the transmission 38 of the drive train 10a.

For the rpm $n_R$ of the rotor 58, the following equation applies:

$$n_R = (1+a) * n_G e - a * n_H,$$

in which $n_R$ is the rpm of the rotor 58, $n_{Ge}$ is the rpm of the transmission input shaft 20, $n_H$ is the rpm of the ring gear, and a is the standard gear ratio of a branching gear embodied as a wheel-revolution gear.

For the standard gear ratio a of the planetary gear 66, the following equation applies:

$$a = Z_H / Z_S.$$

In this equation:

$Z_H$ is the number of teeth of the ring gear 72, and $Z_S$ is the number of teeth of the sun wheel 64.

The rpm $n_R$ of the rotor 20 is thus:

$$n_R = (1 + Z_H/Z_S) * n_G e - Z_H/Z_S * n_H$$

The rpm $n_H$ of the ring gear 72 is dependent on the gear ratio of the gear wheel pair 34, acting as a decoupling stage, and the number of teeth of the gear wheel 33 is $Z_{33}$ and of the gear wheel 35 is $Z_{35}$. The resultant gear ratio is:

$$i = Z_{35}/Z_{33}.$$

The rpm $n_H$ of the ring gear 72 is also dependent on the vehicle speed, which when a gear has been selected is in a fixed, gear-dependent ratio to the rpm $n_{Ge}$. Depending on the type of engine the vehicle has, a gear ratio i of the gear wheel pair 35 can be selected.

In a gear change, the traction force generated by the engine 12 in the transmission 38 is interrupted. The traction force is interrupted because of the fact that the rotationally fixed connection of a shifter unit 42 to an impeller in the transmission 38 is interrupted by displacing the shifter unit 42 by means of a transmission positioner 44. In a gear change, a traction force is now conducted via the planetary gear 70. To that end, the clutch 16 is engaged. A traction force acting as torque from the engine 12 is introduced into the planet carrier 70. At the same time, the controller 52 controls the electrical machine 22, which also generates a traction force acting as torque. The total of the torques of the engine 12 and electrical machine 22a and the torque acting at the ring gear 72 is 0. Thus the torque of the engine 12 can be carried, reinforced by the electrical machine 22a, to the transmission output shaft. Thus the transmission output shaft 36 and finally the wheels 48, via the axle 46, are also driven. The rpm $n_R$ of the rotor 28 and thus of the electrical machine 22a is varied by means of the controller 52 such that the acceleration of the motor vehicle varies only slightly if at all during a gear change. In particular, the sign of the acceleration should not change, so that the same bracing of the drive train 10a is maintained. Because of the bracing of the drive train 10a, no vibration or concussion arises from the engine 12. If the electrical machine 22a is designed for low power levels, then at very high torques of the engine 12 it can happen that the electrical machine 22a is unable to transfer all the torque. In that case, the torque of the engine 12 is reduced by the controller 52. In the table in FIG. 4, the rotary speeds or rpm $n_R$ of the electrical machine 22a and the torques furnished by the electrical machine 22a are shown as examples in terms of concrete gear ratios of a typical drive train 10a. The parameters for this are as follows:

a standard gear ratio a of the planetary gear 66;

a gear ratio i of the gear wheel pair 34;

one column with rpm figures $n_{Ge}$ of the transmission input shaft 20;

five columns with gear ratios for first through fifth gears for the vehicle in motion; and one column for a vehicle that is not in motion, vehicle, where the rpm $n_{Ga}$ of the transmission output shaft is zero.

Under the values for first through fifth gear and for the stopped vehicle, in each case the resultant rotary speeds $n_G$ Of the electrical machine 22 are shown. For example, if shifting from second to third gear is to be done at a rotary speed of the transmission input shaft $n_{Ge}$ of 2400 rpm, then the electrical machine 22a in second gear rotates at a rotary speed $n_R$ of 8700 rpm. A 6-kilowatt electrical machine 22a can support a torque of the engine 12 of 21 Nm. If the torque of the engine 12 is higher, then it has to be reduced to that value. In that case, the electrical machine 22a makes its torque available for supporting the torque of the engine 12. This bypasses the transmission 38. Second gear can be shifted out of. The rpm of the transmission input shaft 20 is adapted by reducing the torque of the engine 12 slightly. In the time while the transmission 38 is disengaged by means of the clutches 42, the electrical machine 22a carries its torque via the planetary gear 66 and carries the torque of the engine 12 to the transmission output shaft 36. Thus no interruption in traction force occurs during the shifting, since the torque of the electrical machine 22a and the torque of the engine 12 are preserved during the shifting operation.

Given a suitable design of the drive train 10a, the clutch 16 can be dispensed with. The requisite traction force for startup can be transferred by the electrical machine 22a to the transmission output shaft 36 via the planetary gear 66, using a traction force generated by the engine 12, and this transfer can be continued at least until the synchronized rpm of first gear is reached.

In the case of the electrical machine 22b of the drive train 10b in FIG. 4, a hollow shaft for the rotor 58 can be omitted. To that end, the electrical machine 22b of the device 21b is disposed on the end of the transmission input shaft 20 remote from the engine 12. The planetary gear 66 is disposed between the transmission 38 and the electrical machine 22b.

Via a hollow shaft 78 and a shifter unit 42, the ring gear 72 of the planetary gear 66 can be coupled to the gear wheel pair 34. It is advantageous that the electrical machine 22*b* can be shifted in its rpm among the ratios of the various gears. As a result, the electrical machine can be designed for a narrower rpm range. When the engine 12 has started, restraint by the parking brake device 50 or the parking block 76 can be dispensed with.

Alternatives are also conceivable. For instance, the rotor 58 can be connected to the planet carrier 70, and the engine 12 can drive the sun wheel 64 or the ring gear 72. The other components of the planetary gear 66 must then be correspondingly transposed.

We claim:

1. A drive train for a motor vehicle, having at least one clutch (16, 42) for interrupting the traction force in the transmission (38) on changing gears, in which the traction force is transferred from an internal combustion engine (12) to a transmission (38), in particular an automatic transmission, and upon interruption of the traction force in the transmission (38) a device (21, 21*a*, 21*b*) for transferring a traction force to a power takeoff side of the transmission (38) is provided by bypassing the transmission (38), characterized in that the device (21, 21*a*, 21*b*) has an electrical machine (22, 22*a*, 22*b*).

2. The drive train of claim 1, characterized in that the electrical machine (22) for transferring the traction force has at least one first, rotatably supported stator (26) and at least one first rotor (24), which both cooperates with the at least one stator (26) and is driven by the engine (12).

3. The drive train of claim 2, characterized in that the at least first stator (26) acts on a transmission output shaft (36).

4. The drive train of claim 2, characterized in that the at least first rotor (24) is connected in a manner fixed against relative rotation to an output shaft (14) of the engine (12).

5. The drive train of claim 2, characterized in that the at least first rotor (24) is connected via a connected via a fixed gear ratio to an output shaft (14) of the engine (12).

6. The drive train of claim 2, characterized in that the electrical machine (22) is used to supply power to the on-board electrical system of the motor vehicle.

7. The drive train of claim 2, characterized in that the electrical machine (22) is used for staring the engine (12).

8. The drive train of one of claim 2, characterized in that the electrical machine (22) has a second stator (30) and a second rotor (28), which both cooperates with the second stator (30) and is connected in a manner fixed against relative rotation to an input shaft (20) of the transmission, so that the electrical machine (22) can be used to synchronize the rpm of the input shaft (20) of the transmission.

9. The drive train of claim 2, characterized in that a parking brake device (50, 60) is provided for preventing rotation of an output shaft (36) of the transmission.

10. The drive train of claim 2, characterized in that the electrical machine (22) is disposed about an input shaft (20) of the transmission.

11. The drive train of claim 1, characterized in that the electrical machine (22*a*, 22*b*) cooperates with a branching gear (66), which acts on a transmission output shaft (36).

12. The drive train of claim 11, characterized in that the branching gear is a wheel-revolution gear (66).

13. The drive train of claim 11, characterized in that the rotor (58) of the electrical machine (22*a*, 22*b*) is connected to the sun wheel (64) of a planetary gear (66); that the sun wheel (64) meshes with planet wheels (65); that the planet carrier (70) can be driven by the engine (12); and that the ring gear (72) acts on the transmission output shaft (36).

* * * * *